Aug. 12, 1947.  H. C. WILSON  2,425,409
TOOL HOLDER
Filed Feb. 21, 1944
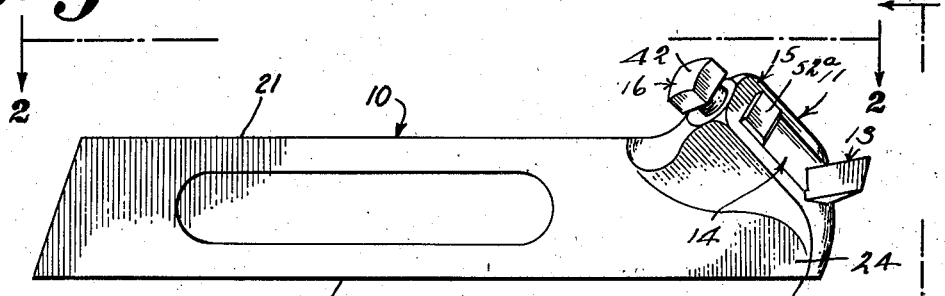
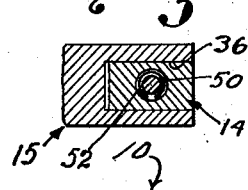
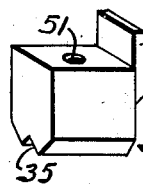
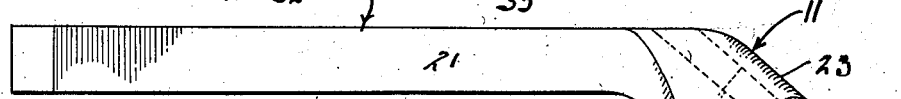
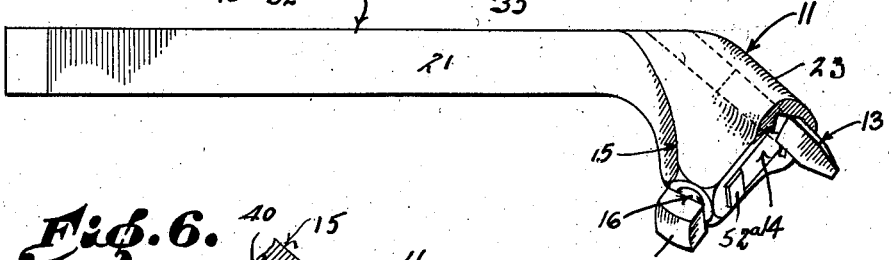
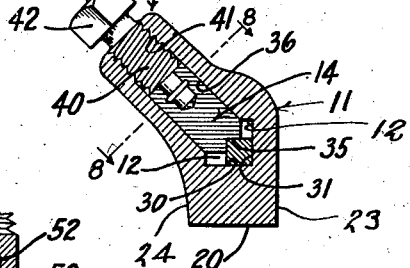
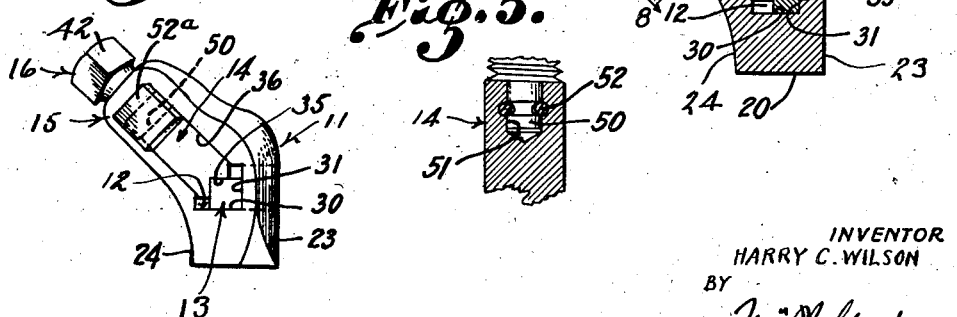
INVENTOR
HARRY C. WILSON
BY
ATTORNEY Patented Aug. 12, 1947

2,425,409

UNITED STATES PATENT OFFICE 2,425,409

TOOLHOLDER

Harry C. Wilson, Beverly Hills, Calif., assignor to Robert H. Clark, Los Angeles, Calif.

Application February 21, 1944, Serial No. 523,267

5 Claims. (Cl. 29—96)

This invention has to do with a tool holder and has particular reference to a device for use in a lathe or the like for holding the cutting tool, and it is a general object of the invention to provide a tool holder that is particularly effective and dependable.

The usual lathe is provided with a carriage the top of which has a tool rest or support for receiving a tool holder, and a tool post projects from the rest and is in the nature of a clamping device for securing the tool holder to the rest. The usual tool holder has a shank to engage the rest and a head at the outer end of the shank with a socket to hold the cutting tool. The usual tool holder has a set screw carried by the head opposed to the bottom of the socket to make the tool tight in the holder. In practice this tool holding means is not altogether satisfactory as it is often difficult to make the cutting tool secure or firm against slight movement. If a cutting tool moves or shifts even slightly during operation it is likely to cause damage to the work.

An object of my present invention is to provide a tool holder in which the cutting tool is held or clamped in such a manner as to be effectively held against shifting or slight movement under all operating conditions. By my invention I do not merely clamp the cutting tool in the holder but I wedge the cutting tool in the holder so it is held most effectively.

Another object of my invention is to provide a tool holder of the general character referred to wherein there is a clamp block or shoe that bears against the cutting tool to clamp or hold it in the holder which shoe has a more effective clamping and gripping action than does the usual set screw employed in tool holders.

Another object of my invention is to provide a tool holder of the general character referred to in which the parts are related and disposed so that the operator has a clear, unobstructed view of the cutting part of the tool. The device of the present invention is compact and simple in form and construction and the parts are so disposed as to give the operator a full view of the active part of the cutting tool held by the holder.

The various objects and features of my invention will be fully understood from the following detailed description of a typical preferred form and application of the invention, throughout which description reference is made to the accompanying drawings, in which:

Fig. 1 is a side elevation of the holder provided by my invention showing a cutting tool held therein. Fig. 2 is a plan view of the holder shown in Fig. 1, being a view taken substantially as indicated by line 2—2 on Fig. 1. Fig. 3 is a front view or front elevation of the tool shown in Fig. 1, being a view taken as indicated by line 3—3 on Fig. 1. Fig. 4 is an enlarged detailed transverse sectional view through the head of the holder showing the relationship of the head of the holder, the clamp block and the operating means for the clamp block. Fig. 5 is an enlarged detailed sectional view showing the manner in which the clamp block may be joined to the operating means. Fig. 6 is a view similar to Fig. 4 showing a tool of another size and shape held in the holder. Fig. 7 is a detailed sectional view taken as indicated by line 7—7 on Fig. 4, and Fig. 8 is a perspective view of the clamp block shown apart from the other parts of the structure.

The device of the present invention includes, generally, a shank 10, a head 11 on the forward end of the shank having a channel or socket 12 to carry a tool 13, a clamp block 14 for holding the tool in the socket, an extension 15 of the head to carry the clamp block, and means 16 carried by the extension 15 for operating the clamp block.

It is familiar to those skilled in the art that tool holders are commonly made in various shapes or styles to accommodate different classes of work, it being common to angularly relate the tool-carrying head of the holder to the shank thereof so that the tool is held in the most advantageous position with relation to the work or so that the tool is made accessible to the work. The broader features of my invention are applicable to tool holders, generally, and it is therefore to be understood that these features of the invention may be applied to tool holders regardless of the relationship of the head and shank. It is most common, however, for general work to employ a tool holder in which the head at the forward end of the shank is pitched or angularly disposed to one side of the longitudinal axis of the shank, usually at an angle of about 30° relative to the longitudinal axis of the shank, and in using such a device the shank is clamped to the rest by the tool post so that it is angularly related to the work in a manner to bring the tool held by the head of the holder into position where its longitudinal axis is at substantially right angles to the work.

Since the type or form of tool holder last mentioned is by far the most common in general use, I have elected to illustrate my invention as applied to that particular form or type of holder, and I will make particular reference thereto, it being understood, however, that I do not wish to thereby limit or restrict the broader principles of the invention to this or any other particular type or form of holder.

The shank 10 of the holder embodying my invention may be of general shape and form common to devices of this general character. For instance, as shown in the drawings, the shank may be an elongate bar substantially rectangular in cross-section, and having a flat bottom 20 to bear on the rest of the lathe and having a flat top 21 to receive the clamp screw of the tool post.

The head 11 is formed or provided on the forward end of the shank 10 as an elongate extension thereof and in practice is positioned or disposed relative to the shank to be angularly related thereto. In the particular case illustrated the head 11 is an integral continuation of the shank angularly disposed relative to the shank so that it projects from the forward end of the shank at an angle of about 30°. The head is angularly disposed or pitched to extend horizontally beyond the forward end of the shank and to extend laterally away from one side thereof so its forward end is offset from said side of the shank. In the preferred formation the bottom 22 of the head 11 is flat and continuous with the bottom 20 of the shank while the sides 23 and 24 of the head are substantially vertical or perpendicular to the bottom 22.

The channel or socket 12 is provided in the head to receive and hold the tool 13. Tools such as the tool 13 used in machine work are commonly elongate bars of steel, or like material, having the characteristics desired for cutting and they may be of any desired cross section. It is most common, however, for cutting tools to be in the form of bars square or rectangular in cross section, the most common form of cutting tool being square in cross section. Some cutting tools are round in cross section, as shown in Fig. 6. I have illustrated my invention in a form designed to handle various cutting tools and for example have shown both square and round tools held in the holder. It is understood, of course, that the outer or cutting end of the tool is dressed to have the desired cutting action and does not necessarily have any direct relationship to the shank or body of the tool.

The channel or socket 12, in accordance with my invention, is an opening formed in or through the head 11 at the desired angle, and is characterized by the fact that it has a bottom 30 and a side 31 which join to form a crotch into which the cutting tool 13 is adapted to be clamped by the block 14. The socket extends lengthwise of the head, or in other words follows the angle or pitch of the head, and it may be inclined somewhat as I will hereinafter describe. It will be apparent that the bottom 30 and side 31 of the socket may be related to accommodate a cutting tool of any particular cross sectional configuration. In the case where the conventional cutting tool is used, that is, one that is square in cross section as shown in Figs. 1 to 4 of the drawings, the bottom and side of the socket are arranged at 90° relative to each other. In the preferred arrangement the side 31 is vertical or perpendicular to a horizontal plane and the bottom 30 is horizontal in a direction transverse of the socket.

If it is desired to give the cutting tool an upward pitch as it extends from the head the socket is pitched or angularly disposed in the head 11 so that the bottom 30 extends upward and forward. It will be apparent that the forward end or front face of the head and of the upward extension 15 thereof may be shaped or finished in any suitable manner. With the unique head and extension that I have provided the front face when disposed as just described is inclined or pitched rearwardly so it extends upward and rearward as shown in the drawings. It is preferred, however, to make it substantially flat and so that it is in a plane at right angles to the longitudinal axis of the tool 13 held in the socket.

The clamp block 14 is carried by the extension 15 of the head 11 to enter the channel 12 and engage the tool 13. The inner or clamping face of the clamp block is preferably finished to have a most effective bearing engagement on the tool 13. In the case illustrated a V-shaped groove 35 is provided in the inner face of the block. Such groove will receive a round tool as shown in Fig. 6, or will receive the corner of a square tool opposite the corner held between the bottom 30 and side 31 of the channel.

The block extends a suitable distance lengthwise of the tool 13 and projects into a guide-way 36 provided in the extension 15. The block slidably fits the guide-way in the extension 15 so that it can be readily moved into pressure engagement with the tool 13. In accordance with my invention I operate the block 14 so that the tool 13 is held by a wedging action and it is, therefore, preferred to dispose the guideway 36 so that the block is moved toward the corner formed by the bottom 30 and side 31 of the socket. With this arrangement of the guideway 36 the extension 15 with the guide-way in it projects from the head upwardly and laterally at an angle of about 45° as will be apparent from Fig. 3 of the drawing. The extension is pitched in a direction to extend away from the same side of the shank that the head is pitched away from. This causes the extension to be offset laterally from the head and shank and to be related to the other parts so that it in no way interferes with or obscures a clear view of the cutting end of the tool 13.

With the construction above described there will be a space between the upper end 50 of the guide-way and the upper end 51 of the block 14. To prevent chips or foreign matter from getting into this space I prefer to provide a lip or shield 52ª on the block to overlie the front of the extension 15 in the region of the guideway to cover the guideway and thus prevent the entrance of foreign matter into the space mentioned.

The means 16 provided for operating the block 14 is preferably a simple clamp screw 40 threaded in an opening 41 in the extension 15 opposite the outer end of the block. The head 42 of the screw is immediately beyond the outer portion of the extension 15 where it can be readily engaged by a wrench. As the screw 40 is operated to move inwardly in the opening 41 it bears on the block 14 and presses or clamps it tightly against the tool 13 so that the tool in turn is wedged into the corner formed by the bottom 30 and side 31 of the socket.

In the preferred form of the invention I connect the screw 40 and the block so that as the screw is operated to move outwardly in the opening 41 the block is lifted from the tool 13. The screw and block may be connected in various ways, one example being shown in the drawings. In Fig. 5 I illustrate a stem 50 on the screw rotatably entering a socket 51 in the outer end of the block, and a snap ring 52 operates in registering grooves in the stem 50 and socket 51.

From the foregoing description it will be apparent that I have provided a construction which is extremely simple and inexpensive of manufacture and which operates to hold a tool 13, not by merely clamping it against a flat face, as is common in tool holders, but by wedging it into a corner or crotch so that it is held by a wedging action and by frictional engagement with at least two faces or surfaces of the tool. When the surfaces of the notch 35 in the clamp block are considered it will be apparent that a square tool is held by frictional engagement with all four sides simultaneously and a round tool is frictionally engaged at four spaced points or lines of contact.

Having described only a typical preferred form and application of the invention I do not wish to be limited or restricted to the specific details herein set forth, but wish to reserve to myself any variations or modifications that may appear to those skilled in the art or fall within the scope of the following claims.

Having described my invention, I claim:

1. A tool holder of the character described including, an elongate shank having a plain bottom adapted to rest on a horizontal support, an elongate head projecting from the forward end of the shank and angularly related thereto to be pitched away from one side of the shank to extend horizontally forward and laterally relative to the shank, the inner end portion of the head being joined to the forward end of the head while the forward end portion of the head is laterally removed horizontally a substantial amount from the plane of said side of the shank, a polygonal tool carrying socket extending through the head lengthwise thereof and opening at the forward end thereof, an extension on the upper portion of the head angularly related thereto to be pitched away from the shank in the same general direction that the head is pitched therefrom to project diagonally upward and laterally from the head, and clamp means carried by the extension to engage and clamp a tool in the socket including a clamp screw carried by and extending in the direction of the said extension and clamping toward one corner of the socket, the screw having an operating head at the top of the extension.

2. A tool holder of the character described including, an elongate shank having a plain bottom adapted to rest on a horizontal support, a head at the forward end of the shank angularly related thereto be pitched away from one side of the shank to extend horizontally forward and laterally relative to the shank so its forward end is horizontally removed from the plane of said side of the shank, a tool carrying socket extending through the head and opening at the forward end thereof, an extension on the upper portion of the head angularly related thereto to be pitched away from the same side of the shank that the head is pitched away from to project diagonally upward and laterally from the head, the combined head and extension having a substantially flat front face in a plane substantially normal to the direction in which the head extends from the body and pitched to extend upwardly and rearwardly, and clamp means carried by the extension to engage and clamp a tool in the socket including a clamp screw projecting from the top of the extension and extending in the direction in which the extension projects from the head and substantially parallel with the plane of the said front face.

3. A tool holder of the character described including, an elongate shank having a plain bottom adapted to rest on a horizontal support, a head at the forward end of the shank angularly related thereto to be pitched away from one side of the shank to extend horizontally forward and laterally relative to the shank so its forward end is horizontally removed from the plane of said side of the shank, a tool carrying socket extending through the head and opening at the forward end thereof, the socket having a flat vertical side wall and a flat bottom normal thereto forming a right angle corner to hold a tool, an extension on the upper portion of the head angularly related thereto to be pitched away from the same side of the shank that the head is pitched away from to project diagonally upward and laterally from the head, and clamp means carried by the extension to engage and clamp a tool in the socket, including a guideway in the extension extending in a direction normal to the socket and communicating therewith, a clamp block slidably carried in the guideway with a part in the socket having a clamp face directly opposed to the said corner and adapted to engage a tool in the socket, and a screw threaded to the extension and engaging the block to operate it.

4. A tool holder of the character described including, an elongate shank having a plain bottom adapted to rest on a horizontal support, a head at the forward end of the shank angularly related thereto to be pitched away from one side of the shank to extend horizontally forward and laterally relative to the shank so its forward end is horizontally removed from the plane of said side of the shank, a tool carrying socket extending through the head in substantially the same direction in which the head extends relative to the shank and opening at the forward end thereof, the socket having a flat vertical side wall and a flat bottom normal thereto forming a right angle corner to hold a tool, an extension on the upper portion of the head angularly related thereto to be pitched away from the same side of the shank that the head is pitched away from, to project diagonally upward and laterally from the head opposite said corner, and clamp means carried by the extension to engage and clamp a tool in the socket, including a flat sided guideway in the extension extending in a direction normal to the socket and communicating with the socket, a clamp block guided by the sides of the guideway, a screw threaded to the extension with its head projecting from the top of the extension and its inner end extending into the guideway, and means swivelly connecting the inner end of the screw and the block so the block is operable toward and away from said corner by rotation of the screw, the screw being arranged so its axis is parallel with the guideway and intersects the said corner.

5. A tool holder of the character described including, an elongate shank having a plain bottom adapted to rest on a horizontal support, a head projecting from the forward end of the shank angularly related to the shank to be pitched away from one side of the shank to extend horizontally forward and laterally relative to the shank so its forward end is horizontally removed from the plane of said side of the shank, a tool carrying socket extending through the head in the direction of the head and open at the forward end of the head and at the other side of the shank, the socket having a flat vertical side wall and a flat bottom wall normal thereto forming a right angle corner to hold a tool, an extension on the upper portion of the head angularly related thereto to be pitched away from the side of the shank from which the head is pitched to project diagonally upward and laterally therefrom and away from said corner, the combined head and extension having a substantially flat front face in a plane normal to the direction in which the head extends from the body and pitched to extend upwardly and rearwardly, and means for clamping a tool in the corner including a flat sided guideway entering the extension from the said front face and communicating with the socket and extending in the direction of the extension and located directly opposite the corner, a clamp block slidably carried in the guideway with its forward end substantially flush with the said front face and having a clamp face of substantial length directly opposite said corner, a screw threaded to the extension with its head projecting from the top of the extension and its inner end extending into the guideway, and means swivelly connecting the inner end of the screw and the block so the block is operable toward and away from said corner by rotation of the screw, the screw being arranged so its axis is parallel with the guideway and intersects the said corner.

HARRY C. WILSON.

REFERENCES CITED

The following references are of record in the file of this patent:

UNITED STATES PATENTS

| Number | Name | Date |
|---|---|---|
| 1,420,171 | Wille | June 20, 1922 |
| 2,013,701 | Severson | Sept. 10, 1935 |
| 2,136,592 | Mayer | Nov. 15, 1938 |
| 829,081 | Moras | Aug. 21, 1906 |
| 2,210,605 | Speckert | Aug. 6, 1940 |
| 2,314,665 | Specht | Mar. 23, 1943 |
| 1,648,380 | Dover | Nov. 8, 1927 |

FOREIGN PATENTS

| Number | Country | Date |
|---|---|---|
| 2,904 | Great Britain | Feb. 22, 1890 |
| 3,668 | Great Britain | Feb. 14, 1906 |
| 21,028 | France | Nov. 26, 1919 |
| 489,307 | France | Sept. 13, 1918 |